United States Patent
Osako et al.

(10) Patent No.: US 8,115,914 B2
(45) Date of Patent: Feb. 14, 2012

(54) MULTI-OPTICAL AXIS PHOTOELECTRONIC SENSOR

(75) Inventors: Kazunori Osako, Otsu (JP); Takayoshi Takahara, Kusatsu (JP)

(73) Assignee: Omron Corporation, Kyoto (JP)

( * ) Notice: Subject to any disclaimer, the term of this patent is extended or adjusted under 35 U.S.C. 154(b) by 293 days.

(21) Appl. No.: 12/642,509

(22) Filed: Dec. 18, 2009

(65) Prior Publication Data

US 2010/0157290 A1      Jun. 24, 2010

(30) Foreign Application Priority Data

Dec. 19, 2008   (JP) ................. P2008-324077

(51) Int. Cl.
*G01J 1/18* (2006.01)
*G06M 7/00* (2006.01)

(52) U.S. Cl. .............. 356/218; 250/221; 250/222.1; 250/559.12; 340/555

(58) Field of Classification Search .......... 356/213–226, 356/138, 153; 250/221, 222.1, 559.12; 340/555–557

See application file for complete search history.

(56) References Cited

U.S. PATENT DOCUMENTS

| | | | |
|---|---|---|---|
| 6,414,603 B1* | 7/2002 | Yamaguchi et al. ........ 340/815.4 |
| 6,774,352 B2* | 8/2004 | Koyama et al. ............... 250/221 |
| 7,183,533 B2* | 2/2007 | Osako et al. .................. 250/221 |
| 7,227,120 B2* | 6/2007 | Shimokawa et al. ..... 250/214 R |
| 7,326,910 B2* | 2/2008 | Osako et al. .................. 250/221 |
| 2003/0052254 A1* | 3/2003 | Kudo et al. .................... 250/221 |
| 2004/0159778 A1* | 8/2004 | Sakaguchi ..................... 250/221 |
| 2006/0022120 A1* | 2/2006 | Iwasawa ........................ 250/221 |
| 2008/0179505 A1* | 7/2008 | Inoue et al. .................... 250/221 |
| 2011/0226938 A1* | 9/2011 | Tagashira .................... 250/222.1 |

FOREIGN PATENT DOCUMENTS

| | | | |
|---|---|---|---|
| JP | 11-345548 A | | 12/1999 |
| JP | 2002-124169 A | | 4/2002 |
| JP | 3724397 B2 | | 9/2005 |
| JP | 02008180649 | * | 8/2008 |

* cited by examiner

*Primary Examiner* — Hoa Pham
(74) *Attorney, Agent, or Firm* — Foley & Lardner LLP

(57) ABSTRACT

This invention enables a worker, who performs a work for optical axis adjustment, to easily grasp whether adjustment for further increasing the light receiving quantity is possible. In a multi-optical axis photoelectronic sensor, a minimum value of the light receiving quantities obtained for every optical axis is detected every time a process of measuring, while lighting each light emitting element 10 by turns, the light receiving quantity of a light receiving element corresponding to a lighted light emitting element 10 is repeated for one cycle, and a peak value of the minimum light receiving quantities detected in the past is detected. A bar graph based on specific values of the most recent minimum light receiving quantity and the peak value, or a bar graph showing a proportion of the most recent minimum light receiving quantity with respect to the peak value is displayed using a plurality of indication lights 100, each arranged on the front surfaces of a light projector 1 and a light receiver 2. The bar graph changes according to the update of the peak value and the fluctuation in the value of the minimum light receiving quantity of every hour.

5 Claims, 13 Drawing Sheets

TO EXTERNAL SWITCH MECHANISM

FIG. 6

| PATTERN NUMBER | 0 | 1 | 2 | 3 | 4 | 5 |
|---|---|---|---|---|---|---|
| DISPLAY PATTERN | ☐☐☐☐☐ | ☐☐☐☐▨ | ☐☐☐▨▨ | ☐☐▨▨▨ | ☐▨▨▨▨ | ▨▨▨▨▨ |

FIG.7

| PATTERN NUMBER | 0 | 1 | 2 | 3 | 4 | 5 |
|---|---|---|---|---|---|---|
| VALUE OF R, P (%) | 0 to 69 | 70 to 99 | 100 to 199 | 200 to 299 | 300 to 399 | GREATER THAN OR EQUAL TO 400 |

FIG.9

| PATTERN NUMBER | 0 | 1 | 2 | 3 | 4 | 5 |
|---|---|---|---|---|---|---|
| VALUE OF REAL | SMALLER THAN OR EQUAL TO (TH-1) | TH to (Z+TH-1) | (Z+TH) to (2Z+TH-1) | (2Z+TH) to (3Z+TH-1) | (3Z+TH) to (PL-1) | GREATER THAN OR EQUAL TO PL |

(1)

Real = 200
Peak = 300

(2)

Real = 200
Peak = 400

MULTI-OPTICAL AXIS PHOTOELECTRONIC SENSOR

This nonprovisional application claims priority under 35 U.S.C. §119(a) on Patent Application No. 2008-324077 filed in Japan on Dec. 19, 2008, the entire contents of which are hereby incorporated by reference.

BACKGROUND OF THE INVENTION

1. Technical Field

The present invention relates to a multi-optical axis photoelectronic sensor for determining light entering/light shielding state for every plurality of optical axes, and in particular, to a multi-optical axis photoelectronic sensor having a function of outputting information for checking the accuracy of the optical axes alignment between a light projector and a light receiver.

2. Related Art

The light projector and the light receiver of the multi-optical axis photoelectronic sensor have a configuration in which a plurality of light emitting elements or light receiving elements is arranged in a line along a longitudinal direction within a long case body, and are arranged facing each other with the position and the direction of each optical axis aligned. In an operation, each optical axis is made effective by turns to light the light emitting element of the effective optical axis, and the light receiving quantity of the corresponding light receiving element is measured. The light entering/light shielding of each optical axis is determined by matching the light receiving quantity obtained for every optical axis with a predefined threshold value (hereinafter referred to as "light entering threshold value").

When installing such a multi-optical axis photoelectronic sensor, worker needs to check that an optical axis on the light projector side and an optical axis on the light receiver side are aligned. In this regard, a sensor having the function of displaying information indicating the accuracy of the optical axes alignment has been conventionally developed.

For instance, Japanese Unexamined Patent Publication No. 11-345548 describes obtaining a proportion of the number of optical axes, whose light receiving quantity is greater than a constant threshold value, with respect to the total number of optical axes, and displaying such proportion in a bar graph using a plurality of indication lights. Japanese Unexamined Patent Publication No. 2002-124169 describes dividing a light receiving element group into a plurality of groups and providing a display unit for every group, and lighting the display unit corresponding to a group whose light receiving quantity is greater than a reference voltage.

Japanese Patent Publication No. 3724397 describes measuring, based on the sequential lighting of each light emitting element, the light receiving quantity of the light receiving element corresponding to the lighted light emitting element, and displaying, in a bar graph or the like, a minimum value (hereinafter referred to as "minimum light receiving quantity") of the light receiving quantities, which are obtained while the measurement on each light receiving element makes one round.

FIG. 14 schematically shows a relationship between an angular shift amount between the optical axis on the light projector side and the optical axis on the light receiver side, and the light receiving quantity. With 0 degree defined as a complete match in the directions of each optical axis, the angular shift amount is expressed by a relative angle of one optical axis with respect to another optical axis.

In the figure, the light receiving quantity greater than the light entering threshold value is obtained in a range the relative angle is between $\theta 1$ and $\theta 2$. The light receiving quantity increases as the shift of the optical axis becomes smaller. Although not shown, a relationship similar to that shown in FIG. 14 may be realized between the positional shift amount of each optical axis and the light receiving quantity.

Therefore, the light receiving quantity is desirably made as high as possible to stably determine the light entering/light shielding for every optical axis. In the inventions described in Japanese Unexamined Patent Publication Nos. 11-345548 and 2002-124169, however, obtaining a light receiving quantity greater than the light entering threshold value is taken as a criterion of optical axis alignment, the work might be terminated without being able to secure a degree of margin with respect to the light entering threshold value.

In the invention described in Japanese Patent Publication No. 3724397, a minimum light receiving quantity of the light receiving quantities retrieved from each light receiving element is displayed, enabling an adjustment to be made to obtain the light receiving quantity having margin of a certain extent with respect to the light entering threshold value. However, in the invention described in Japanese Patent Publication No. 3724397, if the detected minimum light receiving quantity exceeds a displayable range, whereafter it becomes difficult to judge to what extent the light receiving quantity can be increased. Furthermore, the completion of the optical axis adjustment at sufficient accuracy may not be assured even if the light receiving quantity is increased to the displayable range since the measureable light receiving quantity differs depending on the distance between the light projector and the light receiver, the peripheral environment, or the like.

SUMMARY

The present invention has been devised to solve the problems described above, and an object thereof is to enable a worker to easily grasp whether adjustment for further increasing the light receiving quantity is possible during the adjustment work of the optical axis so that the optical axis adjustment of high accuracy can be carried out.

In accordance with an aspect of the present invention, there is provided a multi-optical axis photoelectronic sensor including a light projector in which a plurality of light emitting elements is arranged in a line, a light receiver in which a light receiving element of the same number as each light emitting element is arranged in a line at an interval corresponding to each light emitting element, a measurement unit for measuring, while lighting each light emitting element by turns, a light receiving quantity of the light receiving element corresponding to a lighted light emitting element, and a determination unit for determining light entering/light shielding of each optical axis based on the light receiving quantity measured from each light receiving element.

The multi-optical axis photoelectronic sensor further includes: a representative value acquiring unit for obtaining a representative light receiving quantity of all optical axes using the light receiving quantity measured while a measurement process on each light receiving element is performed for at least one cycle; a peak value storage unit for storing a peak value of the light receiving quantity; a peak value updating unit for comparing the representative light receiving quantity obtained by the representative value acquiring unit with the peak value stored by the peak value storage unit, and rewriting the peak value with the representative light receiving quantity if the representative light receiving quantity is greater than the peak value; and an output unit for outputting information indicating a relationship between the representative light receiving quantity and the peak value.

In the above description, the representative value acquiring unit selects, as the representative value, one of the measurement values (measurement value of every optical axis) of every hour while the measurement process on each light receiving element is executed for a predetermined number of cycles, or obtains the representative value by calculation using each measurement value. However, instead of obtaining all measurement values, an optical axis may be selected for every predetermined interval along the lined direction of the optical axes or a predetermined number of optical axes defined in advance may be selected, and the representative value may be selected from the measurement values on the selected optical axes. Alternatively, the representative value may be obtained by calculation using the measurement value corresponding to each selected optical axis.

In the process of the work of adjusting the optical axes of the multi-optical axis photoelectronic sensor, the light receiving quantity to be measured has a high possibility of fluctuating to various values with changes in the position and the orientation of the light projector and the light receiver to various states. According to the thus configured sensor, the light receiving quantity obtained when the relationship of the optical axes temporarily becomes a preferable state while the light receiving quantity greatly fluctuates by the adjustment work is held as the peak value, and the information indicating the relationship of the current light receiving quantity with respect to the peak value can be output. The worker thus can easily grasp whether adjustment to further increase the light receiving quantity from the current state is possible. The position and the orientation of the light projector and the light receiver are adjusted such that the light receiving quantity as close as to the peak value can be obtained, enabling the optical axes be accurately aligned and a state in which an object can be stably detected be set.

In one preferred aspect of the multi-optical axis photoelectronic sensor, the representative value acquiring unit acquires, as the representative light receiving quantity, a minimum value of the light receiving quantities obtained while the measurement process on each light receiving element is performed for a predetermined number of cycles. The accuracy of the adjustment is ensured at any optical axis if the minimum value of the measured light receiving quantity satisfies the requirement necessary for the optical axis adjustment. According to such an aspect, the relationship between the peak value of the past minimum light receiving quantity and the current minimum light receiving quantity is presented, and hence the work is performed until the values thereof become sufficient magnitude bringing each optical axis aligned at high accuracy.

If the variation of the light receiving quantity obtained while the measurement for a predetermined number of cycles is performed is within a predetermined tolerable value, the intermediate value, the average value, or the like of the light receiving quantities may be set as the representative light receiving quantity.

In a sensor according to another preferred aspect, the output unit is configured as a unit for displaying the representative light receiving quantity and the peak value in a manner enabling their matching. For instance, the representative light receiving quantity and the peak value may be displayed as lined in up and down or right and left as bar graphs having different colors. In place of the bar graph, specific numerical values of the representative light receiving quantity and the peak value may be displayed in line. If the light receiving quantity is classified into a plurality of levels, the levels each corresponding to the representative light receiving quantity and the peak value may be displayed in line.

According to the above aspect, the worker can easily determine the extent of difference between the current light receiving quantity and the peak value. The accuracy of the optical axis adjustment can be enhanced by performing the work such that the display showing the representative light receiving quantity comes to the display showing the peak value.

In the sensor according to still another preferred aspect, the output unit is configured as a unit for displaying information representing a proportion of the representative light receiving quantity with respect to the peak value when a value having a degree of margin of greater than or equal to a predetermined value with respect to a threshold value (light entering threshold value) employed by the determination unit to determine the light entering/light shielding is stored in the peak value storage unit as the peak value. In this aspect as well, display by specific numerical values can be made in addition to the display in the form of a bar graph. The magnitude of proportion may be divided into a plurality of levels, and a symbol representing the corresponding level may be displayed.

According to the above-described aspect, the proportion of the representative light receiving quantity with respect to the peak value is displayed after the peak value becomes a value having sufficient degree of margin with respect to the light entering threshold value, and thus the worker can enhance the accuracy of the optical axis adjustment by adjusting the position and the orientation of the light projector and the light receiver so that higher proportion is displayed. A display that acts as an indication to end the optical axis adjustment may be the same even if the value that can be detected as the peak value is different depending on the difference in the distance between the light projector and the light receiver, and the like. The worker thus can easily judge whether or not to proceed the adjustment work, and the usability improves.

The processes by each unit of the representative value acquiring unit, the peak value updating unit, and the output unit are desirably continued even after the adjustment of the optical axis is ended and the actual use of the sensor is started. This is because abnormality can be detected if a shift occurs at the optical axis for some reason. However, if the operating state of the sensor continues for a long time, the light receiving quantity may gradually lower by degradation of the circuit including the light emitting element and the light receiving element, contamination of the light projecting surface/light receiving surface and the like, and thus the difference between the peak value held by the peak value storage unit and the representative light receiving quantity becomes greater even if the optical axis is not shifted. In such a state, the information to be output changes even if the optical axis is not shifted, whereby presence of shift of the optical axis becomes difficult to determine.

In light of the problems described above, the multi-optical axis photoelectronic sensor according to yet another aspect further includes: a history data storage unit for storing history data of the representative light receiving quantity; and a peak value revision unit for downwardly revising a peak value at a current time, based on a relationship between the history data from the current time to a predetermined time point in the past and the peak value at the current time stored in the peak value storage unit.

According to such an aspect, if the light receiving quantity lowers by the operation of the sensor of a long period of time, the peak value is downwardly revised in accordance with the light receiving level, whereby the information to be output is prevented from changing even if the light receiving quantity is lowered unless the optical axis is shifted. If the optical axis is shifted, on the other hand, a large difference creates between the current value of the light receiving quantity and the peak value even with the downwardly revised peak value, and thus the content of the information to be output can be changed. Therefore, the shift of the optical axis can be stably determined even long time after the installation of the sensor.

According to the multi-optical axis photoelectronic sensor of the present invention, the light receiving quantity at the most preferable adjustment state in the course of the work of adjusting the position and the orientation of the light projector and the light receiver is held as the peak value, and the information indicating the relationship between such a peak value and the most recent light receiving quantity is output. Thus, the worker, who performs the work for optical axis adjustment, can easily judge whether or not adjustment with further accuracy is possible, and perform highly accurate optical axis adjustment.

BRIEF DESCRIPTION OF THE DRAWINGS

FIG. 6 is a view schematically showing a specific example of a display pattern table;

FIG. 7 is a view showing an example of data configuration of a reference table;

FIG. 9 is a view showing another example of the reference table;

DETAILED DESCRIPTION

Figure 1:
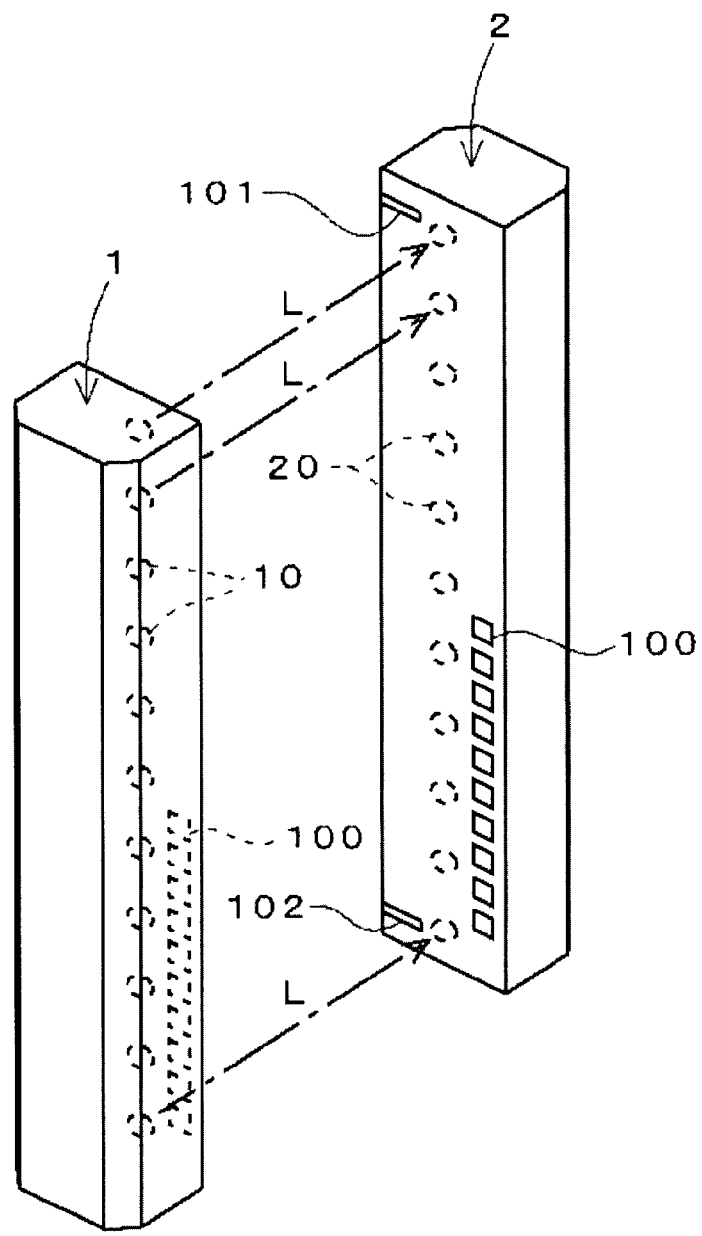
FIG. 1 is a perspective view showing an outer appearance of a multi-optical axis photoelectronic sensor.

FIG. 1 shows an outer appearance of a multi-optical axis photoelectronic sensor applied with the present invention. The multi-optical axis photoelectronic sensor is configured by a light projector 1 and a light receiver 2, which have long shapes. A plurality of light emitting elements 10 (LED) is arranged in a line along a longitudinal direction in the light projector 1, and a light receiving element 20 (photodiode) of the same number as the light emitting element 10 is arranged in a line along a longitudinal direction at the same pitch as the light emitting element 10 in the light receiver 2.

A transparent window (not shown) is respectively formed in a range corresponding to the arrangement of the light emitting elements 10 and the light receiving elements 20 at the front surfaces of the light projector 1 and the light receiver 2. A plurality of (ten in the illustrated example) square indication lights 100 is arranged in a line along the longitudinal direction at the side of the window. The indication lights 100 display a bar graph showing the current light receiving state, as described later.

Indication lights 101, 102 having an elongate shape are arranged at the front surface of the light receiver 2 to correspond to both end positions of the arrangement of the light receiving elements 20. The indication lights 101, 102 are respectively lighted when the light receiving quantity of the corresponding light receiving element 20 becomes greater than the light entering threshold value.

Each indication light 100, 101, 102 includes an LED for a light source, and in addition, includes a light guiding member for guiding the light from the LED to the front surface and a window formed at the front surface.

The light projector 1 and the light receiver 2 are arranged with a predetermined spacing by the worker with the respective front surfaces facing each other. The orientation of the light projector 1 and the light receiver 2 is adjusted so that each light emitting element 10 and each light receiving element 20 faces each other on a one on one relationship. The position and the direction of the optical axes are thus aligned for every combination of the light emitting element 10 and the light receiving element 20, so that the light L from each light emitting element 10 enters the corresponding light receiving element 20.

Figure 2:
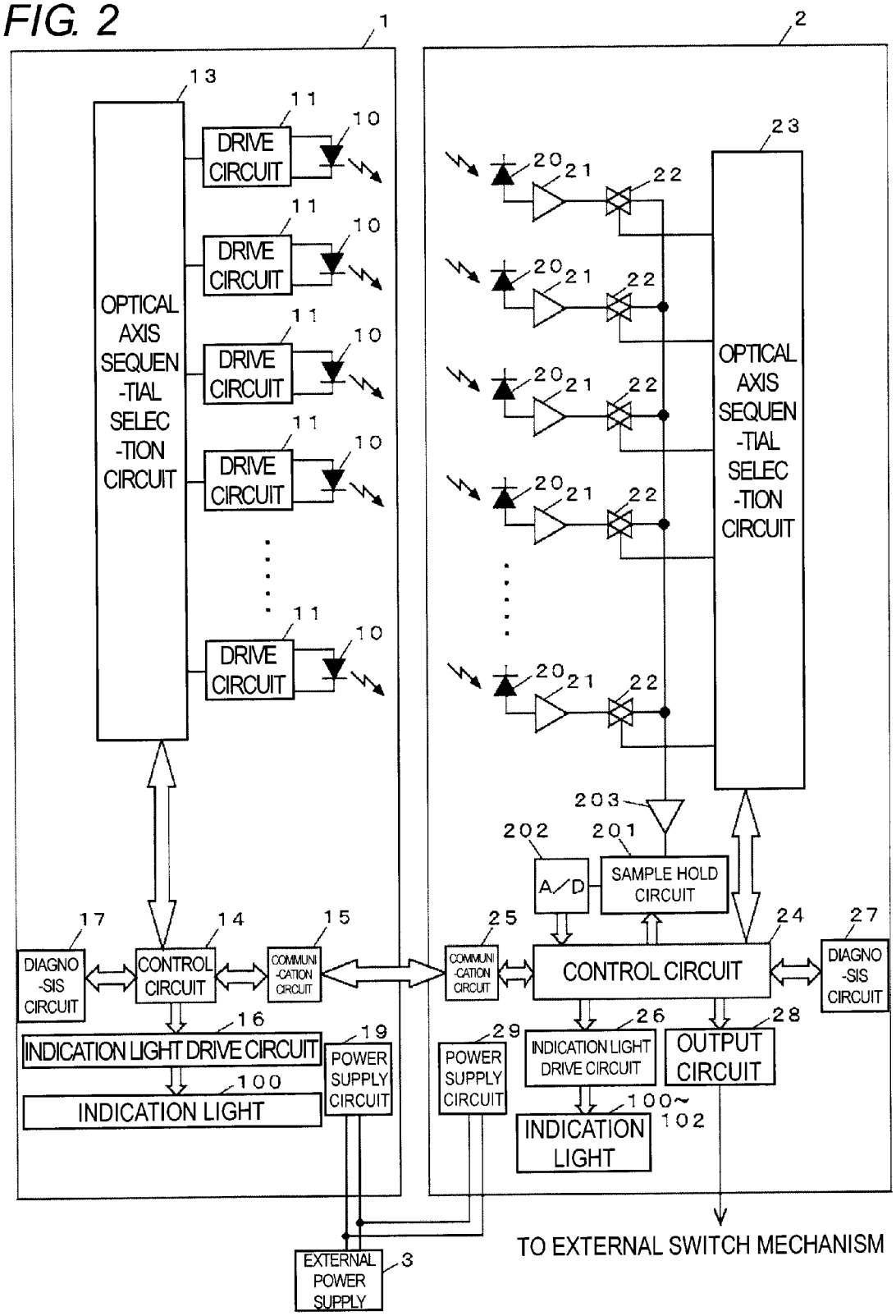
FIG. 2 is a block diagram of the multi-optical axis photoelectronic sensor.

FIG. 2 shows an electrical configuration of the multi-optical axis photoelectronic sensor.

The light projector 1 includes a drive circuit 11 for each light emitting element 10, and also includes an optical axis sequential selection circuit 13, a control circuit 14, a communication circuit 15, an indication light drive circuit 16, a diagnosis circuit 17, and the like. Each light emitting element 10 is connected to the control circuit 14 through the drive circuit 11 and the optical axis sequential selection circuit 13. Each indication light 100 is also connected to the control circuit 14 through the indication light drive circuit 16.

The light receiver 2 includes an amplifier circuit 21 and an analog switch 22 for every light receiving element 20, and also includes an optical axis sequential selection circuit 23, a control circuit 24, a communication circuit 25, an indication light drive circuit 26, a diagnosis circuit 27, an output circuit 28, a sample hold circuit 201, an A/D converter circuit 202, an amplifier circuit 203, and the like. Each analog switch 22 is connected to the control circuit 24 through the optical axis sequential selection circuit 23, and the indication lights 100, 101, 102 are connected to the control circuit 24 through the indication light drive circuit 26.

A common configuration of the light projector 1 and the light receiver 2 will be described below.

The optical axis sequential selection circuit 13, 23 is a gate circuit for sequentially making each optical axis effective one at a time. The diagnosis circuit 17, 27 detects logic of signals exchanged between the circuits, potential of the input/output signal, and the like, and determines whether or not such logic and potential matches the logic and the potential level registered in advance.

The light projector 1 and the light receiver 2 also include power supply circuits 19, 29, respectively. The power supply circuit 19, 29 converts an AC (Alternating Current) voltage supplied from a common external power supply 3 to a DC (Direct Current) voltage to supply to each circuit.

Each control circuit 14, 24 of the light projector 1 and the light receiver 2 is configured by a CPU and a non-volatile memory (not shown). The control circuit 14, 24 communicates with each other through the communication circuit 15, 25, to synchronize the timing of the switching operation of each optical axis sequential selection circuit 13, 23. The control circuit 14 on the light projector 1 side outputs a lighting control signal in accordance with the timing of switching, so that each light emitting element 10 is lighted by turns from the optical axis of upper level.

The control circuit 24 of the light receiver 2 turns ON each analog switch 22 by turns, one at a time, by the switching of the optical axis sequential selection circuit 23. The light receiving signal from the light receiving element 20 corresponding to the lighted light emitting element 10 is thus guided to the sample hold circuit 201 through the amplifier circuit 203. The sample hold circuit 201 is driven in accordance with the timing of switching the analog switch 22 in the ON state. The sampled and held light receiving quantity is subjected to digital conversion by the ND converter circuit 202, and then input to the control circuit 24.

With the above control, while lighting each light emitting element 10 of the light projector 1 by turns, the light receiving quantity of the optical axis corresponding to the lighted light emitting element 10 is measured. A memory of the control circuit 24 of the light receiver 2 includes a table (this table is hereinafter referred to as "light receiving quantity storage table") for storing the light receiving quantity for every optical axis. The control circuit 24 stores the measured light receiving quantity in the light receiving quantity storage table every time measurement is performed on each optical axis. The control circuit 24 also determines the light entering/light shielding of each optical axis by comparing each light receiving quantity with the predefined light entering threshold value, and causes the indication light 100 to display a bar graph showing the current light receiving state.

The light receiving quantity storage table is provided to save the most recent light receiving quantity of each optical axis, and thus is cleared every time an infinite loop is repeated, to be described later.

An output circuit 28 in the light receiver 2 is connected to a switch mechanism (relay, contactor, etc.) of a power supply path to a machine in a dangerous region (not shown) to control the operation of the machine. The control circuit 24 normally sets the output from the output circuit 28 at high level to supply power to the machine with the switch mechanism in the closed state. However, when determined that one of the optical axes is shielding light or when some kind of abnormality is detected in the process performed by the diagnosis circuit 17, 27, the output from the output circuit 28 is switched to low level to stop the machine with the switch mechanism in the opened state.

Figure 3:
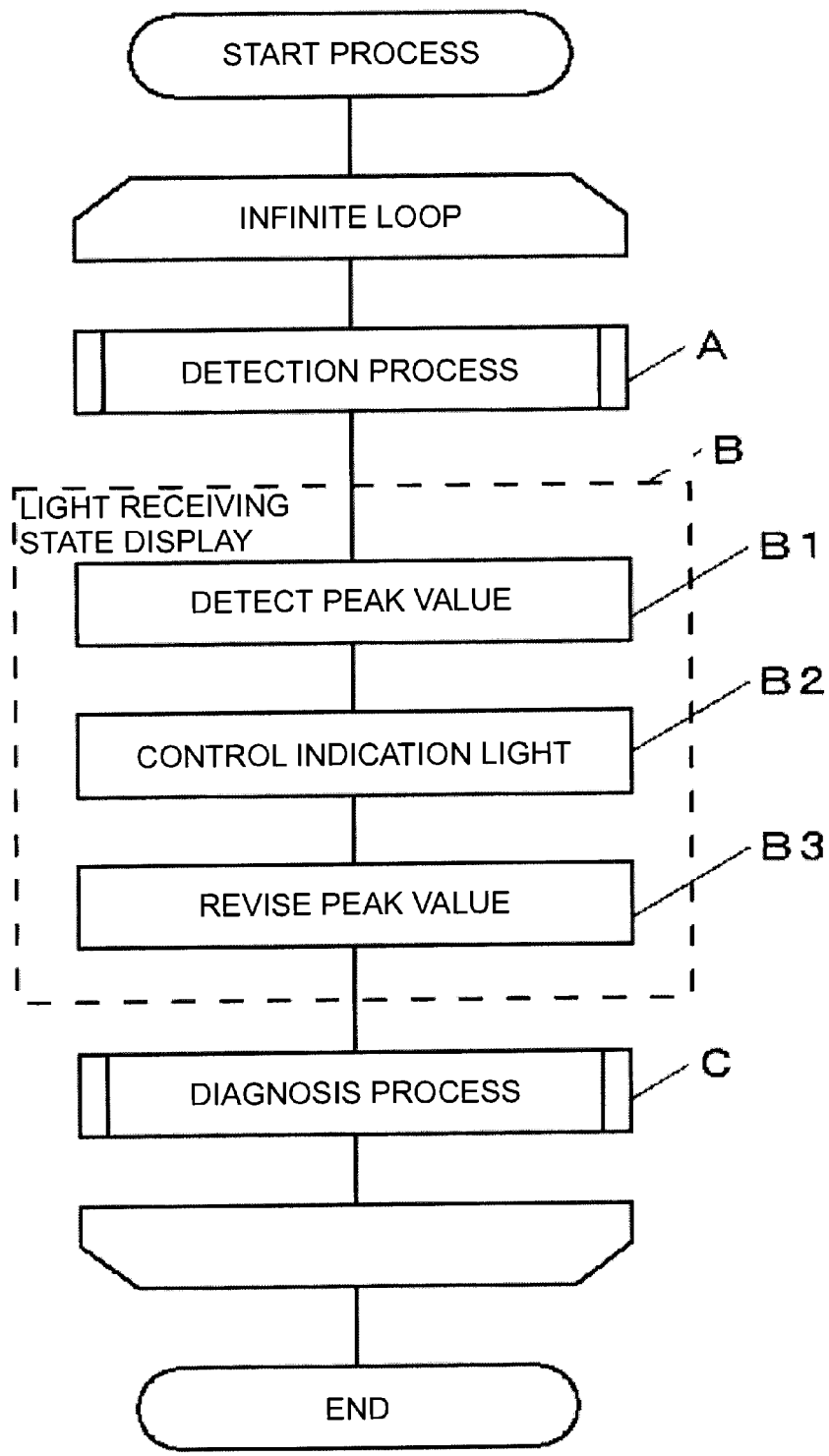
FIG. 3 is a flowchart showing the basic operation of the multi-optical axis photoelectronic sensor.

The thus configured multi-optical axis photoelectronic sensor is designed to repeatedly execute the infinite loop shown in FIG. 3 in response to power ON. The infinite loop is roughly classified into a detection process (step A), a light receiving state display (step B), and a diagnosis process (step C). Such processes are executed by each control circuit 14, 24 of the light projector 1 and the light receiver 2 in cooperation.

The detection process of step A includes a process of lighting each light emitting element 10 by turns and measuring the light receiving quantity of the light receiving element 11 corresponding to the lighted light emitting element 10, a process of determining the light entering/light shielding for every optical axis by comparing each measured light receiving quantity with the light entering threshold value, a process of controlling the output from the output circuit 28 based on the determination result for every optical axis, and the like.

The light receiving quantity of each optical axis is saved in the light receiving quantity storage table, and maintained thereat until the loop shown in FIG. 3 is executed for one cycle and the detection process is again started.

The diagnosis process of step C includes a process of determining presence of occurrence of abnormality based on the processing result by the diagnosis circuit 17, 27, a process of controlling the output of the output circuit 28 according to the determination, and the like.

Step B executed between step A and step C displays a bar graph showing the current light receiving state using the light receiving quantity for every optical axis measured in step A. This display is mainly used for the purpose of checking the accuracy of the optical axis alignment between the light projector 1 and the light receiver 2 at the time of installing the sensor, but is appropriately used for the purpose of checking whether or not shift occurred at the optical axes.

Figure 4:
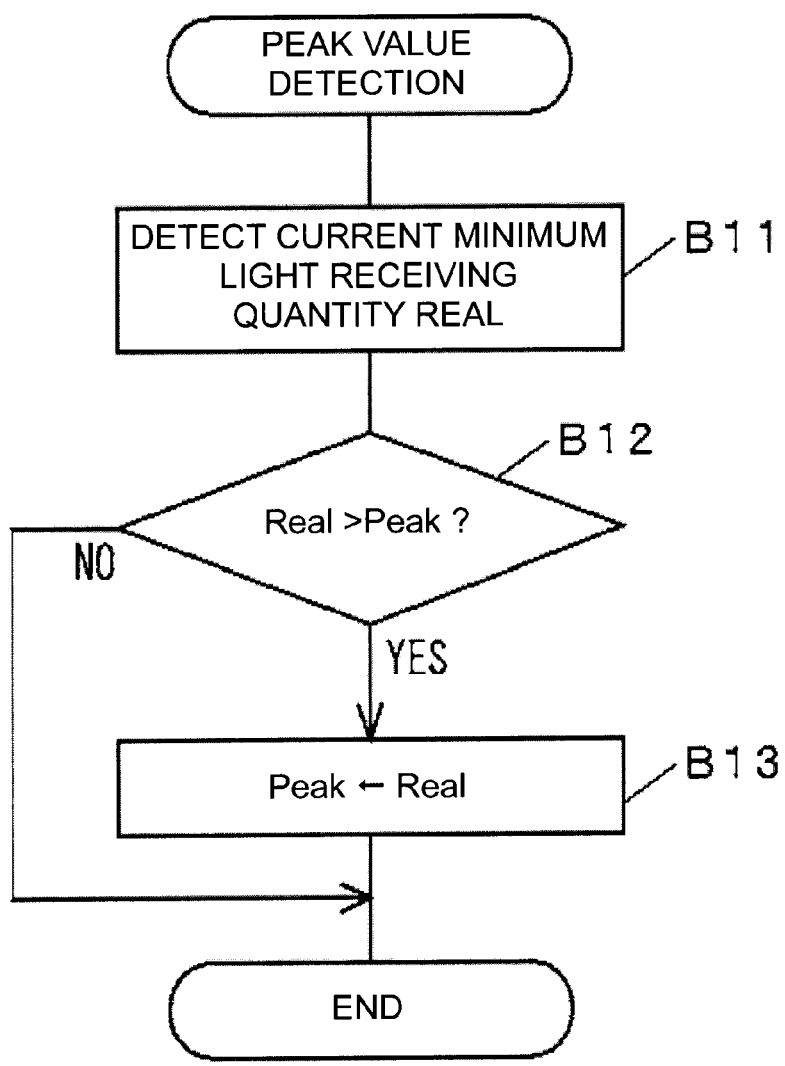
FIG. 4 is a flowchart showing a specific procedure of a peak value detection process.
Figure 5:
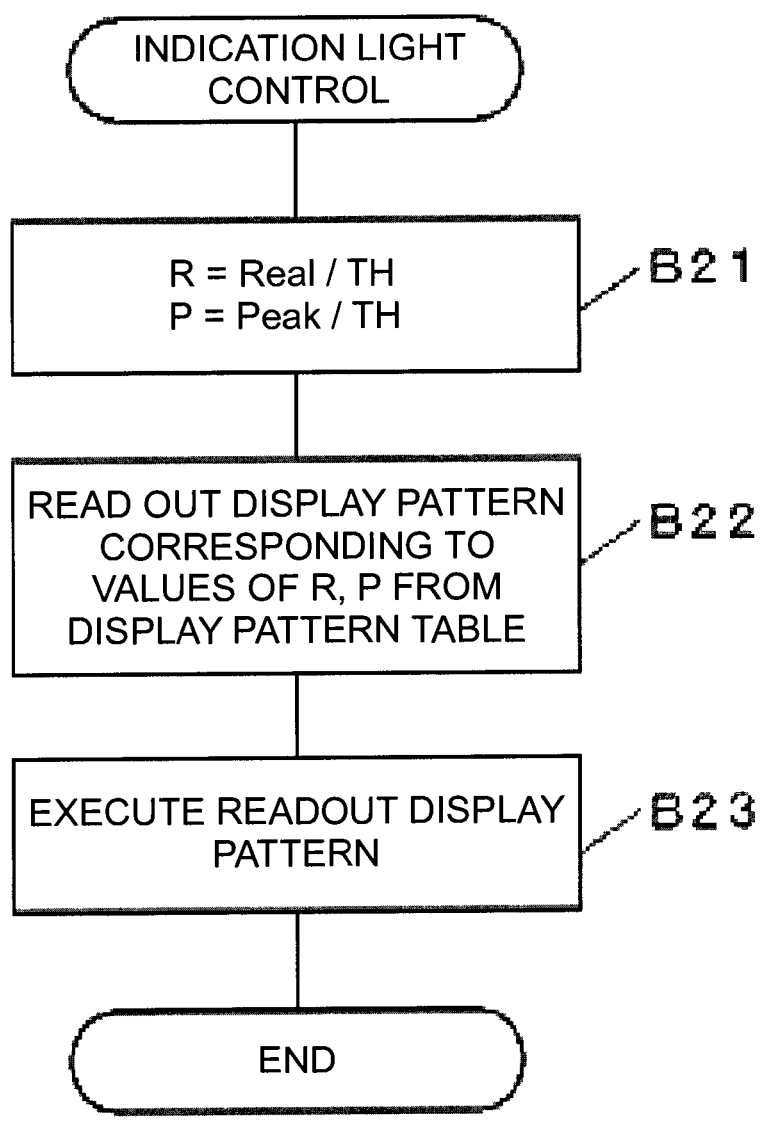
FIG. 5 is a flowchart showing a specific procedure of an indication light control.

Specifically, step B includes each process of peak value detection (step B1), indication light control (step B2), and peak value correction (step B3). FIG. 4 shows a specific procedure related to the peak value detection of such processes, and FIG. 5 shows a specific procedure related to the indication light control. Each process will be described below with reference to such flowcharts.

First, in the peak value detection of FIG. 4, the minimum light receiving quantity Real is detected by comparing the light receiving quantity stored in the light receiving quantity storage table by turns (step B11). The minimum light receiving quantity Real is then compared with a predetermined peak value Peak (step B12). If Real>Peak, the peak value Peak is updated with the value of the minimum light receiving quantity Real (step B13).

In the indication light control of FIG. 5, the parameters R, P for display control are calculated by dividing the minimum light receiving quantity Real and the peak value Peak by the light entering threshold value TH, respectively (step B21).

A display pattern corresponding to the values of R, P is read out from a display pattern table registered in advance in the memory (step B22), and a display by the readout display pattern is executed by each indication light 100 (step B23). In step B22, the display pattern to be read out is specified using a reference table shown in FIG. 7.

Steps B11 to B13 of FIG. 4 and steps B21, B22 of FIG. 5 are executed mainly by the control circuit 24 of the light receiver 2. In step B23 of FIG. 5, the control circuit 24 of the light receiver 2 transmits the display pattern read out in step B22 to the control circuit 14 of the light projector 1, so that both control circuits 14, 24 execute the control of the same content.

Although not shown in FIG. 5, the indication light control of the present example also includes, in addition to the steps B21 to B23, a process of comparing the light receiving quantity of each light receiving element 20 positioned at both ends of the arrangement of the optical axis with the light entering threshold value, and controlling lighting/non-lighting of the indication lights 101, 102 shown in FIG. 1.

In the procedure of FIG. 4, the peak value Peak is stored in the non-volatile memory of the control circuit 24, and is initially set at zero at the time of shipment of the sensor. Therefore, according to the procedure of FIG. 4, the minimum light receiving quantity Real detected immediately after the start of the process is set as a substantial initial value of the peak value Peak, and then the peak value Peak is rewritten with the value of the minimum light receiving quantity Real every time the minimum light receiving quantity Real larger than the set peak value Peak is detected.

Figure 6:
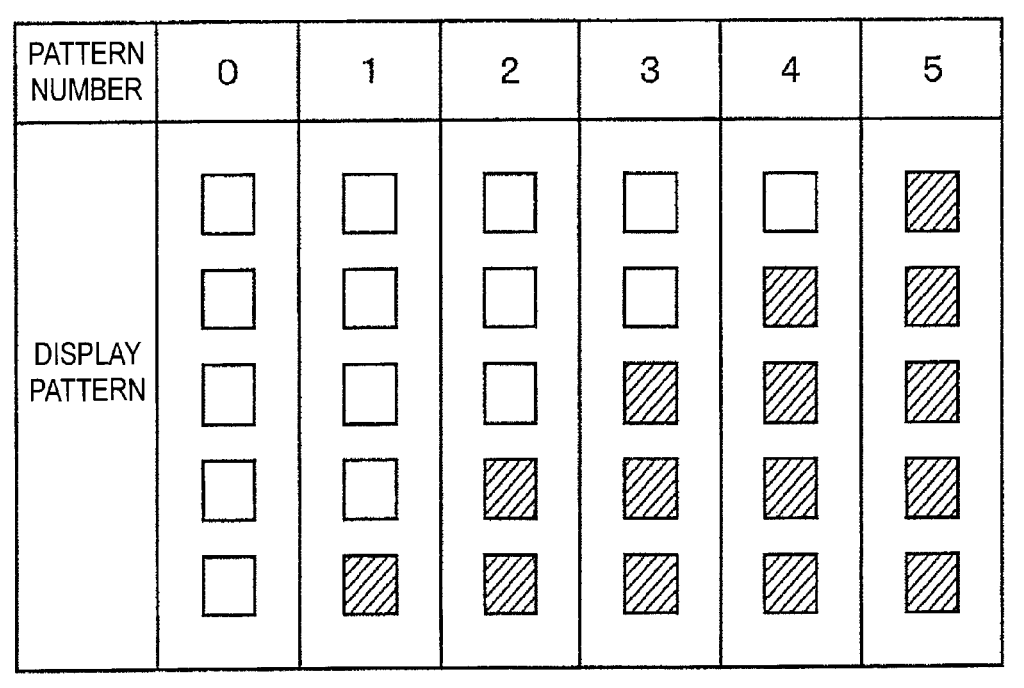

FIG. 6 schematically shows the display pattern table used in the indication light control shown in FIG. 5. In this example, five of the ten indication lights 100 shown in FIG. 1 are used, where each indication light 100 is represented by a rectangle, the indication light 100 to be lighted is shown with a shaded pattern and the indication light 100 not to be lighted is shown with an outlined rectangle.

In the display pattern table, the display pattern having a pattern number of 0 (hereinafter described as "display pattern 0") shows a state in which all five indication lights 100 are not lighted, that is, the bar graph is not displayed. Other display patterns 1 to 5 display the bar graph, and are set such that the bar graph to be displayed becomes higher as the pattern number becomes larger.

In step B22 of FIG. 5, the pattern number corresponding to the values of the parameters R, P is specified for every parameter R, P using the reference table shown in FIG. 7, and the display pattern corresponding to the specified pattern number is read out from the display pattern table.

The reference table in this example shows the numerical range, to which the display patterns 0 to 5 are applied, in correspondence to the pattern number. According to the reference table of FIG. 7, the display pattern 0 or the display pattern 1 is displayed when both the minimum light receiving quantity Real and the peak value Peak have not reached the light entering threshold value TH. Two or more indication lights 100 are lighted when the values become greater than the light entering threshold value TH, and the lager the value is, the higher the bar graph becomes.

Figure 8:
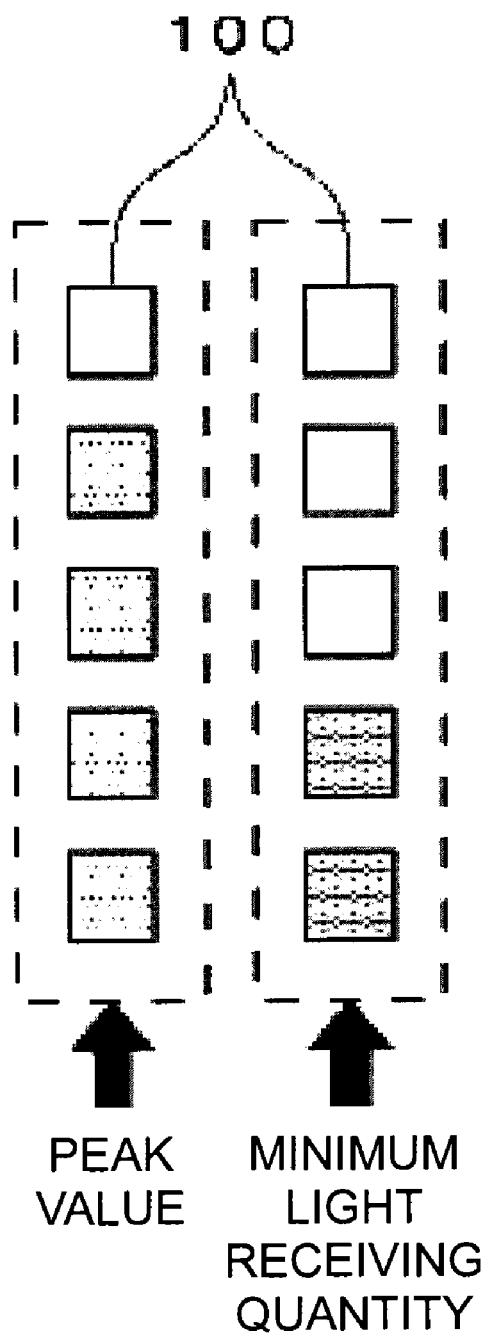
FIG. 8 is a view showing a display example by the control of FIG. 5.

FIG. 8 shows an example in which the indication light 100 is controlled by the display pattern corresponding to the value of the parameters. In the figure, the five indication lights 100 on the left side represent the bar graph based on the parameter P obtained from the peak value Peak, and the five indication lights 100 on the right side represent the bar graph based on the parameter R obtained from the minimum light receiving quantity Real. According to such an example, the bar graph by the display pattern 4 is displayed for the peak value Peak, whereas the bar graph by the display pattern 2 is displayed for the minimum light receiving quantity Real, and hence the worker can easily recognize that the most recent minimum light receiving quantity Real is lower than the peak value Peak.

As shown in FIG. 1, each indication light 100 is actually displayed as lined in tandem, and thus the light emitting color differs for the indication light 100 representing the value of P and the indication light 100 representing the value of R in this example.

Since the worker changes the positions and the orientations of the light projector 1 and the light receiver 2 to various states to align the optical axes thereof at the time of installing the sensor, the minimum light receiving quantity Real for every time may also fluctuate to various values. In this example, however, the peak value detection process shown in FIG. 4 is executed every time the measurement process on each light receiving element 20 makes one round, and thus the minimum light receiving quantity Real obtained when the optical axes are aligned to the most preferred state in the work until then is held as the peak value Peak.

Therefore, when the bar graph of the peak value Peak becomes a height indicating to have sufficient degree of margin with respect to the light entering threshold value, the worker continues the adjustment work until the display of the minimum light receiving quantity Real becomes similar to the display of the peak value Peak to enhance the accuracy of the optical axis adjustment.

According to the reference table shown in FIG. 7, both the peak value Peak and the minimum light receiving quantity Real can express a numerical value of up to four times the light entering threshold value TH. Thus, if both values can be displayed by the display pattern 5, a light receiving quantity having an extremely high degree of margin with respect to the light entering threshold value can be obtained at any optical axis, and the light entering/light shielding can be stably determined. The display pattern 0 or the display pattern 1 is displayed if the peak value Peak is lower than the light entering threshold value, whereby the worker can easily recognize that the adjustment work for increasing the peak value Peak is necessary.

A second example will now be described for the indication light control.

In this example, a bar graph showing the proportion of the current minimum light receiving quantity Real with respect to the peak value Peak is displayed using each indication light 100. The table shown in FIG. 6 is used for the display pattern table itself, similar to the previous example, but the reference table is changed to that shown in FIG. 9.

The reference table of FIG. 9 shows a numerical range corresponding to each display pattern number with the minimum light receiving quantity Real as the target, but is set such that the numerical range fluctuates by the current peak value Peak.

Specifically, PL in FIG. 9 corresponds to 80% of the peak value Peak, and Z corresponds to ¼ of the (PL−TH). In the example of FIG. 9, the numerical value smaller than the TH is corresponded to the display pattern 0, and the numerical value greater than the PL is corresponded to the display pattern 5. The range from the TH to the (PL−1) is divided into four parts based on the Z, and the display patterns 1 to 4 are corresponded to each range, respectively.

Figure 10:
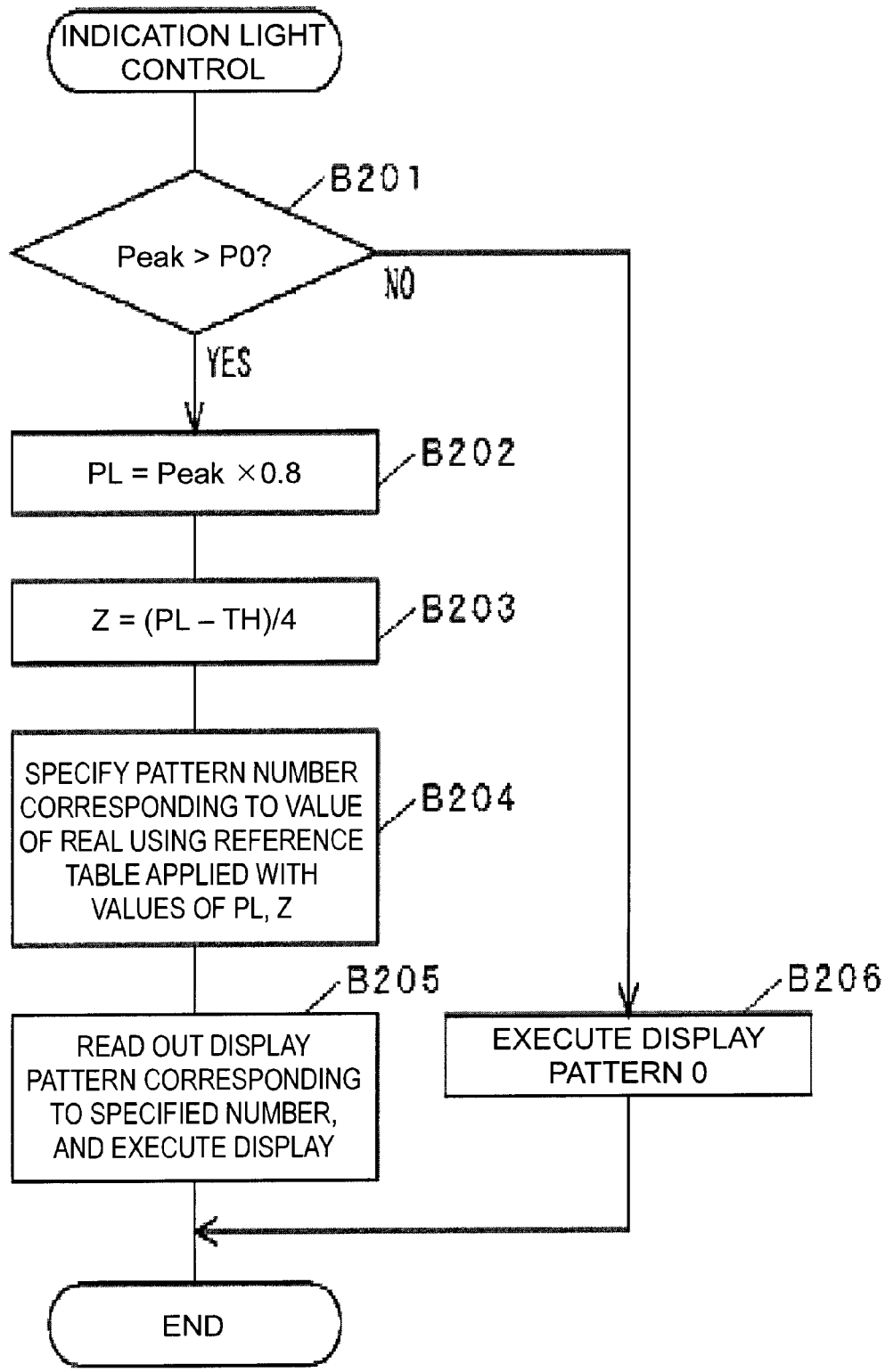
FIG. 10 is a flowchart showing a procedure of the indication light control when using the reference table of FIG. 9.

FIG. 10 shows a procedure of the indication light control using the reference table and the display pattern table.

In this procedure, the peak value Peak is first compared with a predetermined reference value P0 (step B201). A value having sufficient degree of margin with respect to the light entering threshold value TH (e.g., 1.5 times the light entering threshold value TH) is set for the reference value P0, and the display by the display pattern 0 is executed when Peak≦P0 (step B206).

If Peak>P0, the parameters PL, Z to use in the reference table are calculated from the peak value Peak (steps B202, 203). The pattern number corresponding to the current minimum light receiving quantity Real is then specified using the reference table (see FIG. 9) applied with the values of PL, Z (step B204). The display pattern corresponding to the specified number is read out from the display pattern table, and the display by such pattern is executed (step B205).

Figure 11A:
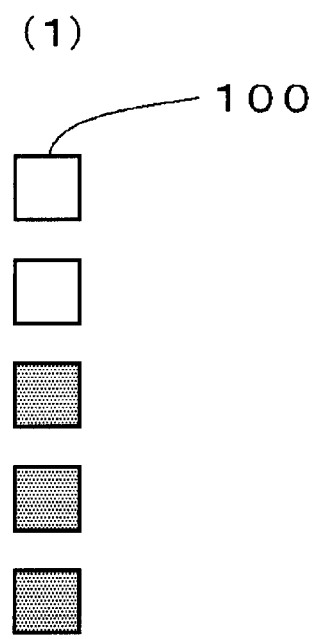
FIGS. 11(1) and 11(2) are views showing a display example by the control of FIG. 10.
Figure 11B:
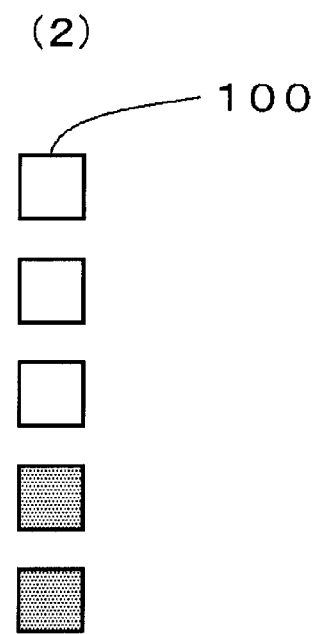

FIGS. 11(1) and 11(2) show display examples based on the above control. The figures show an example in which different display patterns are displayed depending on the values of the minimum light receiving quantity Real and the peak value Peak, with the light entering threshold value TH as 100.

FIG. 11(1) shows a display example of when the minimum light receiving quantity Real is 200 and the peak value Peak is 300. In this case, PL=240 and Z=35, and thus the display pattern 3 is executed.

FIG. 11(2) shows a display example of when the minimum light receiving quantity Real is 200 and the peak value Peak is 400. In this case, PL=320 and Z=55, and thus the display pattern 2 is executed.

According to such display, a display showing specific values of the peak value Peak and the minimum light receiving quantity Real is not made as in the first example, but the proportion of the most recent minimum light receiving quantity Real with respect to the peak value Peak at the current time is always shown when the peak value Peak is greater than the reference value P0, that is, when the degree of margin of the peak value Peak with respect to the light entering threshold value is secured. The worker thus can set a state close to the most preferable adjustment that occurred in the course of work by performing the adjustment work in an aim of displaying the display pattern 5, which shows that the light receiving quantity of greater than or equal to 80% of the peak value Peak can be obtained.

As shown in FIGS. 11(1) and 11(2), the height of the bar graph sometimes lowers when the peak value Peak becomes high even if the value of the minimum light receiving quantity Real is the same. When the peak value Peak is updated to a higher value with the progress of the adjustment work of the optical axis, a more accurate optical axis adjustment can be performed by the display pattern based on the updated peak value Peak.

Although the light receiving quantity that can be acquired as the peak value Peak lowers as the distance between the light projector 1 and the light receiver 2 becomes long, according to the above example, the display pattern 5 can be displayed without being influenced by the high and low of the peak value Peak. Therefore, the worker can proceeds with the work until the display pattern 5 is displayed, without hesitating whether or not to continue the work to accurately align the optical axes between the light projector 1 and the light receiver 2.

As described by the two examples, the peak value detection (steps B21 to B23) is executed every time the process of measuring the light receiving quantity for one cycle with respect to each optical axis is executed in the light receiving state display (step B), so that the light receiving quantity representing the most preferred state that occurred in the course of the adjustment work of the optical axis is held as the peak value. The bar graph showing the relationship between the minimum light receiving quantity Real representing the current light receiving state and the peak value Peak is displayed using the indication light 100 by performing the indication light control (steps B21 to B23 or steps 8201 to 206) following the peak value detection. The worker thus can make the adjustment while referencing the display of the indication light 100 such that the state of each optical axis becomes a state close to when the maximum light receiving quantity is obtained.

As previously mentioned, step B is included in the infinite loop along with step A and step C and is repeatedly executed while the sensor is operating, and thus if the optical axis shifts for some reason and the value of the minimum light receiving quantity Real lowers after the adjustment of the optical axis is completed, the height of the bar graph lowers according to such lowering in the value. The worker then can easily recognize the shift occurred at the optical axis.

If the operation of the sensor continues for a long time and the light receiving quantity lowers due to degradation of the circuit, contamination of the light projecting surface/light receiving surface and the like, the peak value Peak is maintained as at the beginning while the minimum light receiving quantity Real gradually lowers, which also causes the bar graph to lower. In such a state, whether or not the optical axis is shifted becomes difficult to determine. The peak value revision (step B3) performed at the last of the processes of step B is provided to respond to such a problem.

Figure 12:
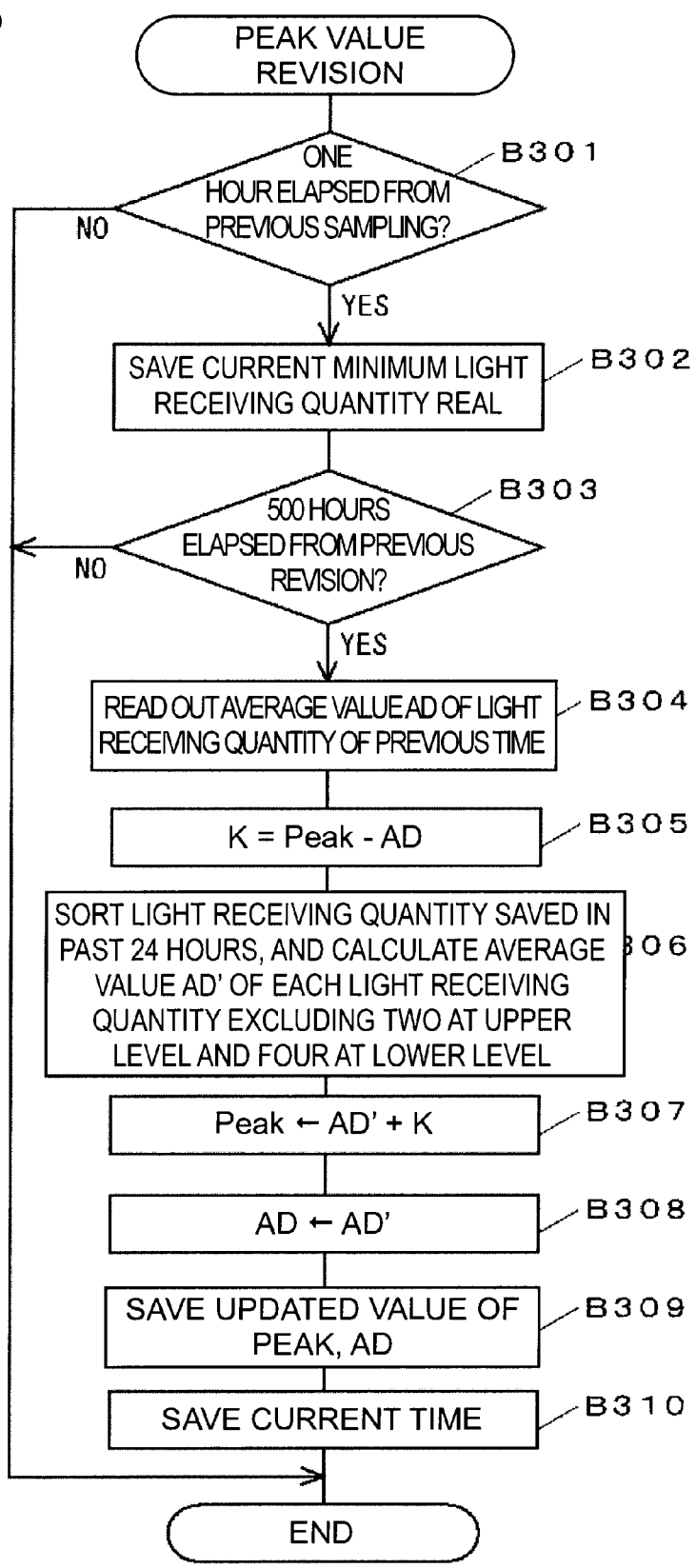
FIG. 12 is a flowchart showing a specific procedure of the peak value revision.

FIG. 12 shows a specific procedure of the peak value revision process.

In this process, the current value (value detected in step B11 of the peak value detection immediately before) of the minimum light receiving quantity Real is sampled every time one hour has elapsed, and the sampled data is saved in the memory (steps B301, 302). In this example, the sampled data is saved limiting to those up to past 24 hours, but the sampling interval and the data storing period can be appropriately changed.

In this process, the peak value Peak is revised every time 500 hours have elapsed by executing each step of B303 to 310.

In this process, an average value AD of the previously calculated light receiving quantity is first read out from the memory, and a difference value K between the current peak value Peak and the average value AD is calculated (steps B304, B305).

The method of calculating the average value AD is as described below. When executing such loop for the first time, the average value AD is calculated and saved at a time point slightly before (e.g., when 300 hours have elapsed).

In this example, 24 light receiving quantities stored in the memory at the time are read out every time 500 hours have elapsed, and sorted based on the respective values. The 18 light receiving quantities, excluding the two at the upper level and four at the lower level, are retrieved from the arrangement of the sorted light receiving quantities, and an average values AD' thereof are calculated (step B306).

The two light receiving quantities at the upper level are excluded from the target in calculating the average value in the process in view of the possibility the light receiving quantity subjected to the influence of noise by disturbance light and the like will be sampled. The four light receiving quantities at the lower level are excluded from the target in calculating the average value in view of the possibility the light receiving quantity reflecting the light shielding state exists.

The above processes are not essential. For instance, a slightly greater number of light receiving quantities may be saved, the light receiving quantity contained between the light entering threshold value TH and a predetermined upper limit greater than the incident threshold value TH may be extracted, and the average value thereof may be calculated.

After the average value AD' is calculated, the difference value K obtained in step S305 is added to the calculated value, and the value of the peak value Peak is updated by the added value (step B307). The AD is updated by the value of the average value AD', and the updated Peak and AD are saved (steps B308, 309). Furthermore, the time at the current time is saved (step 310), and the process is terminated. According to such a process, the state where the peak value Peak is slightly higher than the light receiving quantity of every hour can be maintained while gradually lowering the peak value Peak.

Figure 13:
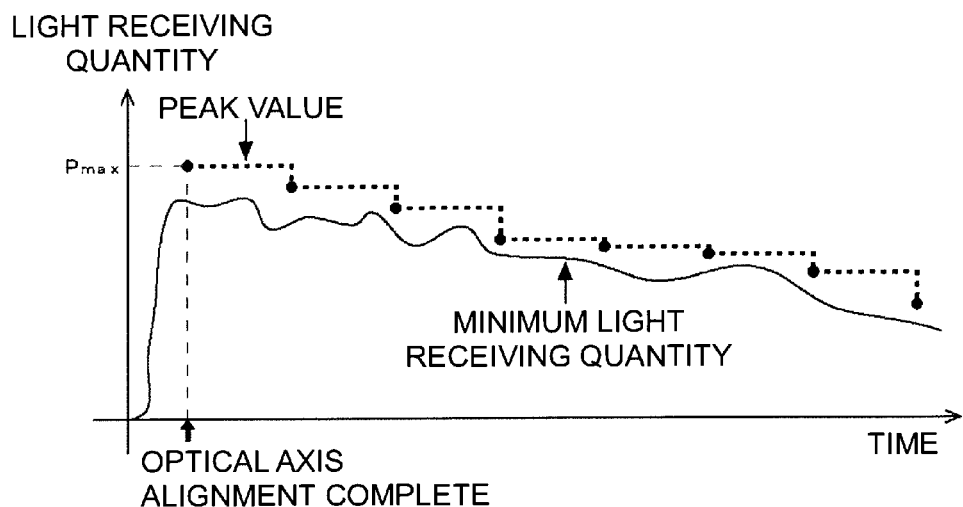
FIG. 13 is a graph showing a relationship between change of the minimum light receiving quantity and change of the peak value corresponding to the process of FIG. 12.
Figure 14:
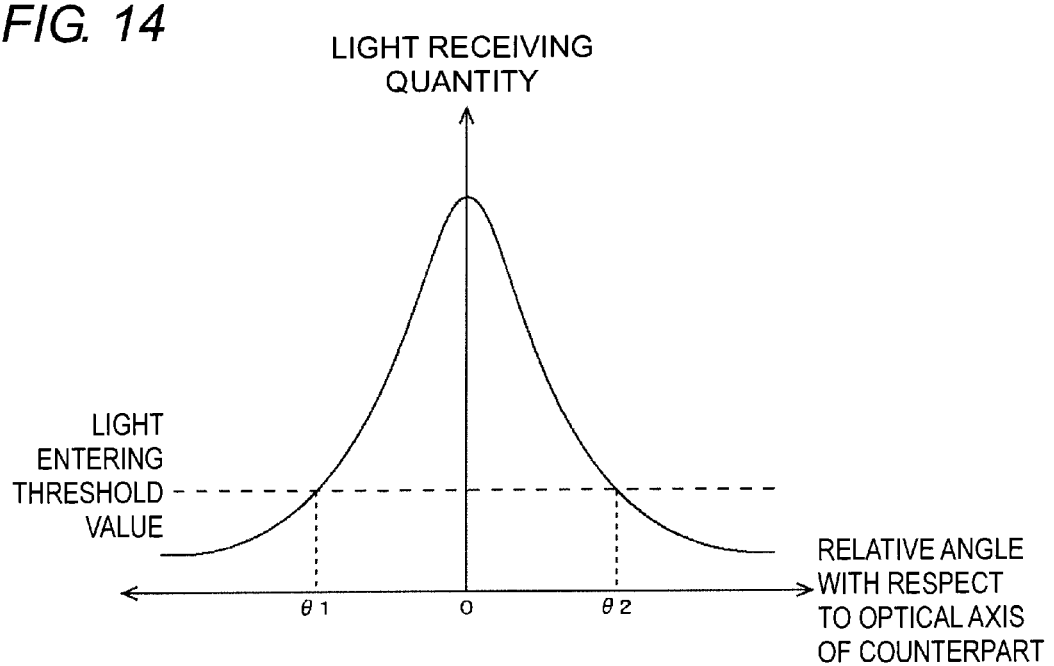
FIG. 14 is a graph schematically showing a relationship between an angular shift amount between the optical axes of the light projector and the light receiver, and the light receiving quantity.

FIG. 13 shows the temporal change of the peak value Peak by the above process and the temporal change with the minimum light receiving quantity in correspondence to each other.

In the figure, Pmax indicates the peak value at the time point the adjustment of the optical axis is completed. If the minimum light receiving quantity gradually lowers overtime, as shown in the figure, the peak value is downwardly revised by the peak value revision process. The difference with and the proportion of the minimum light receiving quantity with respect to the peak value are thus prevented from greatly fluctuating even when the minimum light receiving quantity lowers.

Since the minimum light receiving quantity further lowers from the illustrated level if shift occurs in the optical axis, the difference between the peak value revised by the average value obtained from the light receiving quantity before the occurrence of the shift and the minimum light receiving quantity reflecting the shift becomes large, and the display pattern different from those without shift at the optical axis can be presented. The presence of shift of the optical axis can be determined without trouble based on the display pattern expressed by the indication light 100 even if the light receiving quantity lowers while using the sensor for a long period of time.

The algorithm of the peak value revision process is not limited to that shown in FIG. 12. For instance, a step of obtaining an average value of the minimum light receiving quantity Real within a predetermined time in the past, and a step of comparing the relevant average value with an average value of the previous time may be executed at an appropriate time interval, and the peak value Peak may be downwardly revised based on the most recently obtained average value when the difference with respect to the average value of the previous time exceeds a predefined threshold value.

Although not shown in the algorithm of FIG. 12, the peak value Peak is desirably fixed without performing the peak value revision process after the corrected peak value Peak reaches a certain value to ensure safety. With this, the worker can recognize that the maintenance of the sensor is necessary since the difference between the minimum light receiving quantity Real and the peak value Peak thereafter becomes greater and the content of display changes. It is also necessary that the peak value Peak can be appropriately returned to the initial value of zero by the operation of the worker to respond to change in the installation of the sensor, and the like.

In the above example, the relationship between the current minimum light receiving quantity Real and the peak value Peak is displayed in the form of a bar graph, but not limited thereto, and change in value may be expressed by the luminance of the indication light 100. Alternatively, a number display may be arranged at the side surface etc. of the light projector 1 and the light receiver 2, and specific values of the Real and the Peak or numerical values representing a specific proportion may be displayed. Furthermore, when connecting the sensor to an external device such as a dedicated display or a personal computer, the displaying information may be output to such a device to be displayed on the external device side.

In the examples described above, the minimum light receiving quantity Real is detected every time the measurement process with respect to each light receiving element 20 is executed for one cycle, but not limited thereto, the minimum light receiving quantity may be detected every time the measurement process is executed for several cycles.

What is claimed is:

1. A multi-optical axis photoelectronic sensor including a light projector in which a plurality of light emitting elements is arranged in a line, a light receiver in which a light receiving element of the same number as each light emitting element is arranged in a line at an interval corresponding to each light emitting element, a measurement unit for measuring, while lighting each light emitting element by turns, a light receiving quantity of the light receiving element corresponding to a lighted light emitting element, and a determination unit for determining light entering/light shielding of each optical axis based on the light receiving quantity measured from each light receiving element;

the multi-optical axis photoelectronic sensor comprising:
a representative value acquiring unit for obtaining a representative light receiving quantity of all optical axes using the light receiving quantity measured while a measurement process on each light receiving element is executed for at least one cycle;
a peak value storage unit for storing a peak value of the light receiving quantity;
a peak value updating unit for comparing the representative light receiving quantity obtained by the representative value acquiring unit with the peak value stored by the peak value storage unit, and rewriting the peak value with the representative light receiving quantity if the representative light receiving quantity is greater than the peak value; and
an output unit for outputting information indicating a relationship between the representative light receiving quantity and the peak value.

2. The multi-optical axis photoelectronic sensor according to claim 1, wherein the representative value acquiring unit acquires, as the representative light receiving quantity, a minimum value of the light receiving quantities obtained while the measurement process on each light receiving element is executed for a predetermined number of cycles.

3. The multi-optical axis photoelectronic sensor according to claim 1, wherein the output unit is configured as a unit for displaying the representative light receiving quantity and the peak value in a manner enabling matching.

4. The multi-optical axis photoelectronic sensor according to claim 1, wherein the output unit is configured as a unit for displaying information representing a proportion of the representative light receiving quantity with respect to the peak value when a value having a degree of margin of greater than or equal to a predetermined value with respect to a threshold value employed by the determination unit to determine the light entering/light shielding is stored in the peak value storage unit as the peak value.

5. The multi-optical axis photoelectronic sensor according to claim 1, further comprising:
a history data storage unit for storing history data of the representative light receiving quantity; and
a peak value revision unit for downwardly revising a peak value at a current time, based on a relationship between the history data from the current time to a predetermined time point in the past and the peak value at the current time stored in the peak value storage unit.

* * * * *